United States Patent

[11] 3,622,439

| [72] | Inventors | Stanley Manne<br>South Holland;<br>Myron S. Beyer, Danville, both of Ill. |
|---|---|---|
| [21] | Appl. No. | 731,563 |
| [22] | Filed | May 23, 1968 |
| [45] | Patented | Nov. 23, 1971 |
| [73] | Assignee | Tee-Pak, Inc.<br>Chicago, Ill.<br>Continuation-in-part of application Ser. No. 658,764, Aug. 7, 1967. This application May 23, 1968, Ser. No. 731,563 |

[54] OXYGEN IMPERMEABLE FILM LAMINATE
5 Claims, 5 Drawing Figs.

[52] U.S. Cl. ................................................. 161/184,
161/190, 161/227, 161/231, 161/251, 161/254,
161/256, 260/830 P, 260/859 R
[51] Int. Cl. ..................................................... B32b 27/30,
B32b 27/38, B32b 27/40
[50] Field of Search........................................... 161/190,
231, 227, 251, 254, 184; 260/859 R, 830 P

[56] References Cited
UNITED STATES PATENTS

| 2,460,573 | 2/1949 | Folt ............................... | 260/78.5 |
| 2,504,417 | 4/1950 | Hofrichter ..................... | 161/Vinylidene |
| 2,999,782 | 9/1961 | Justice et al. ................. | 161/254 X |
| 3,021,250 | 2/1962 | La Voie ......................... | 156/324 |
| 3,036,945 | 5/1962 | Souza ............................. | 154/53.5 |
| 3,231,419 | 1/1966 | Korpman ....................... | 117/122 |
| 3,280,217 | 10/1966 | Lader et al. ................... | 260/844 |
| 3,293,111 | 12/1966 | McCormick ................... | 161/184 X |

*Primary Examiner*—John T. Goolkasian
*Assistant Examiner*—C. B. Cosby
*Attorney*—Neal J. Mosely ABSTRACT: Impermeable plastic film laminates for use in the packaging of food products and other materials are formed by adhesive lamination of polyethylene or other plastic films to plastic films such as nylon, polyester, cellophane, polypropylene, polyehtylene, polyvinyl chloride, etc., by adhesive lamination with an oxygen and moisture vapor impermeable saran-containing adhesive, the adhesive preferably including a polymeric polyisocyanate. The polyehtylene portion of the laminate provides for heat sealability of the resulting film laminate. The nylon, polyester, cellophane, polypropylene, etc., film gives flex strength, abrasion resistance, gloss, vacuum formability, etc., to the film laminate. The saran adhesive gives an impermeable film laminate upon curing. In the manufacture of the film laminate, a pressure sensitive but curable saran adhesive is applied to one of the plies of the film laminate on an ordinary plastic film coater or printing press and the two film combined and rolled up on a windup reel. The pressure applied to the film laminate in the windup reel is the laminating force applied to the film and the film laminate is cured simply by being stored under pressure of being wound on the rolls. After curing of the saran adhesive, the plastic film plies cannot be easily separated.

PATENTED NOV 23 1971 3,622,439

STANLEY MANNE
MYRON S BEYER
*INVENTOR.* their attorney

STANLEY MANNE
MYRON S BEYER
*INVENTOR.*

BY their attorney

OXYGEN IMPERMEABLE FILM LAMINATE

CROSS-REFERENCES TO RELATED APPLICATIONS

This application is a continuation-in-part of U.S. Pat. application Ser. No. 658,764, filed Aug. 7, 1967.

BACKGROUND OF THE INVENTION

This invention relates to new and useful improvements in the production of oxygen and moisture vapor impermeable film packaging materials and methods of manufacturing the same, and especially to the adhesive lamination of polyethylene films to films such as nylon, polyester, cellophane, polypropylene, polyethylene, polyvinyl chloride, etc.

A thin packaging material that has low oxygen and moisture vapor transmission rates is needed for many of today's packaging requirements, especially for protection against flavor loss or contamination and against moisture loss or gain. Saran films are known for these protective qualities.

The term saran is applied to a family of thermoplastic resins, viz vinylidene chloride polymers, and copolymers of vinylidene chloride with other monomers such as vinyl chloride, acrylonitrile, methyl methacrylate, acrylates, acrylate esters, vinyl acetate, etc. Copolymers of vinylidene chloride with other monomers are generally described in terms of the weight ratio of the monomer units in the copolymer. Saran, by definition, has at least 50 percent vinylidene chloride.

Saran, as a packaging material has several defects. Saran film is expensive and is difficult to seal into packages. Because of these factors, saran has been used extensively as a coating or laminate on other packaging films.

Cellophane coating technology permits the use of a saran coating with barrier properties and flexible film performance because of the thin gauge of the coating that contributes to these properties. However, the coating operation is relatively expensive and if the coating is made too thick, the flexible film performance will be lost. Furthermore, saran-coated cellophane is difficulty heat sealable and is moisture-sensitive, which has limited its field of use considerably.

Plastic film laminates having oxygen and moisture vapor barrier properties have been provided through the use of multiply film laminates wherein at least one of the plies is oxygen and moisture vapor impermeable or through the use of a saran-coated film as one component. This ply is normally saran, saran-coated polyester, or saran-coated cellophane. Typically, the saran or saran-coated cellophane film is adhesively laminated onto a film (or films) such as polyethylene as a heat-sealable medium. However, this process uses expensive equipment not available to most film converters. It would be desirable to produce an impermeable laminate by a simple and/or less expensive process.

STATEMENT OF OBJECTS AND FEATURES

It is, therefore, one object of this invention to provide a new and inexpensive laminated impermeable packaging film.

Another object of this invention is to provide a new and improved process for the preparation of laminated impermeable packaging film.

A feature of this invention is the provision of an improved film laminate product comprising two or more films laminated with moisture vapor and oxygen impermeable saran-containing adhesive.

Another feature of this invention is the provision of a new and improved process for film lamination wherein a film laminate is produced by laminating one film to another with a moisture vapor and oxygen impermeable saran adhesive.

Other objects and feature of this invention will become apparent from time to time throughout the specification and claims as hereinafter related.

SUMMARY OF THE INVENTION

An oxygen and moisture vapor impermeable film laminate is prepared using a saran-containing adhesive. The adhesive is preferably applied to one ply of a two-ply laminate and the coated ply wound together with the uncoated ply on a storage reel. The adhesive is cured merely by storage of the tightly wound reel and produces a tightly adhered laminate. One of the plies is normally surface treated polyethylene to provide for heat sealability of the resulting film laminate. The other poly is typically nylon, polyester, cellophane, polypropylene, etc., to give the required flex strength, abrasion resistance, gloss, vacuum formability, etc., to the film laminate. The saran-containing adhesive gives an oxygen and moisture vapor impermeable film laminate upon curling.

DESCRIPTION OF THE PREFERRED EMBODIMENTS

This invention is directed to the production of new film packaging materials in the form of multiply laminates adhered with a saran-containing adhesive. This invention broadly comprises a new and improved process for lamination of dimensionally stable plastic films such as nylon, Mylar (polyester), cellophane, polypropylene, polyethylene vinyl, etc. to a plastic film such as polyethylene with a saran-containing adhesive which, upon curing, forms an oxygen and moisture vapor barrier layer, and the film-packaging material or film laminate so produced. The laminating adhesive preferably includes a polymeric polyisocyanate resin as the adhesive portion, together with a saran resin in a proportion sufficient to provide oxygen and moisture vapor properties in the resulting laminate.

The preferred adhesive is a solution of the blended saran and polyisocyanate resins. The saran/polyisocyanate adhesive is generally formulated as follows. All parts are by weight.

A. Dissolve Saran F-220—22 percent in 3 parts methyl ethyl ketone/2 parts toluene.

B. Dilute Mondur CB, Mondur MR, Marlon 383 or other polyisocyanate to 25 percent solids with additional methyl ethyl ketone.

C. Blends of the above are useful in the range of 0.5–1.5 parts of A per part of B. The limit of useful adhesion is 2 parts Saran F-220 to 1 part Mondur CB on a solids basis.

The resulting solution can be employed in the lamination process to give a homogeneous lamination intercoat.

The process of lamination is preferably carried out using a printing press or a laminator for application of the laminating adhesive and the windup reel for the two film plies as the sole means of securing a tightly laminated film structure. However, other lamination processes may be employed in accordance with this invention. The adhesively laminated film is cured by storage in a tightly wound roll. If desired, the cure may be accelerated by storage at a slightly elevated temperature. The resulting film laminate is optically clear and has high moisture vapor and oxygen barrier properties. The barrier film formed by the hardened adhesive is continuous and homogeneous.

Figure 1:
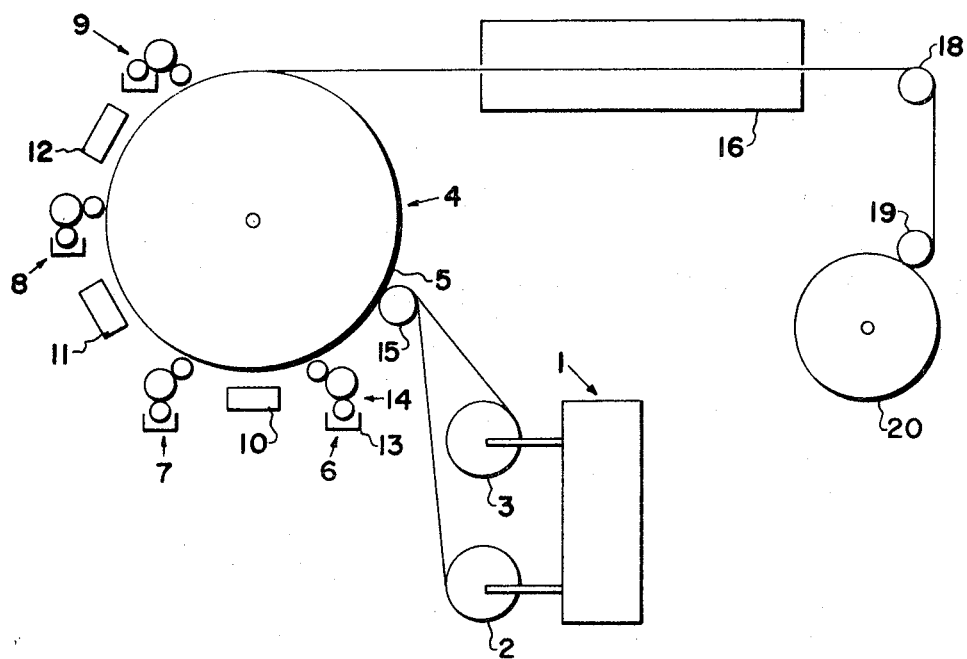
FIG. 1 is a schematic view of one preferred form of this invention in which a pair of film plies are fed through a press for application of an adhesive and lamination upon winding on a storage reel.
Figure 2:
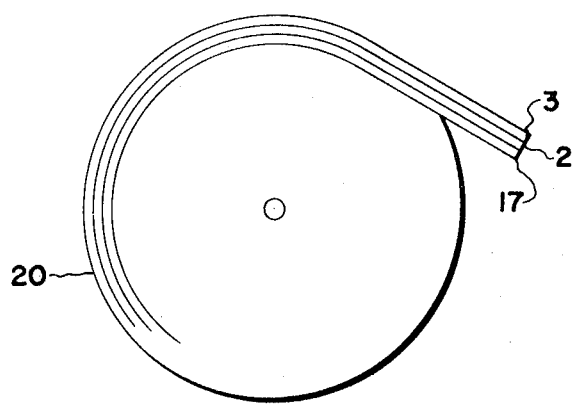
FIG. 2 is a detail end view of the laminated film on the storage reel of FIG. 1 showing the relationship of the laminated plies.

In FIGS. 1 and 2 of the drawing, the process of lamination which comprises a preferred embodiment of this invention is illustrated with respect to the printing of a pair of identical or different film plies on a printing press and subsequent lamination of the plies.

Referring to the drawings by numerals of reference, and more particularly to FIG. 1, there is shown a plastic film unwind stand 1 having a pair of rolls 2 and 3 of plastic film arranged for feeding film to a printing press for printing and for application of a saran-containing adhesive. Printing press 4 includes rotary drum 5 and has a plurality of printing stations 6, 7, 8, and 9 with intermediate dryers 10, 11, and 12 arranged to dry the imprint from each previous printing station. The printing stations are shown diagrammatically as including a container or well 13 for the printing ink or laminating saran adhesive and a train of printing rollers 14 arranged to transfer ink in the desired imprint to the film being passed around printing drum 5.

In the arrangement shown in FIG. 1, film 3 is polyethylene, which has the surface adjacent to printing drum 5 oxidized or irradiated or otherwise treated to render it receptive to printing inks or adhesive. The film 2 leaving the roll is of a dimensionally stable film material, such as nylon, Mylar (polyester), cellophane, polypropylene, polyethylene, etc., which contacts film 3 as it is fed past roller 15 at the input end of the printer. As the two plies of film are fed around printing drum 5, the outer film, viz, the nylon, Mylar, cellophane polypropylene or polyethylene is printed at the successive printing stations 6, 7, and 8 and the imprints dried by dryer units 10, 11, and 12. At the last printing station 9, a saran-containing adhesive coating is imprinted over the entire surface of the outer film ply. The saran-containing adhesive which is applied at this station is a pressure sensitive adhesive which is rendered dry to the touch when the films are passed through dryer 16. The saran-containing adhesive which is used is one which is pressure sensitive but curable on extended storage at room temperature or may be cured by storage at a slightly elevated temperature for short periods of time.

After the film plies 2 and 3 have been printed and provided with a saran-containing adhesive coating 17 such as those described in the following examples, the film plies are passed through dryer 16 where the adhesive coating is dried and rendered largely tack free. The film plies then pass over roller 18 and press roller 19 and are wound on reel 20 under a slight pressure exerted by press roll 19. As the film plies are wound on reel 20, sufficient pressure is applied by press roll 19 and by the tension of winding the films on the reel to ensure a very tight contact between saran adhesive layer 17 on film 2 and the outer (oxidized or treated) surface of film 3 with which the saran adhesive is contacted as the films are wound on reel 20.

Where the film is completely wound on reel 10, as shown in FIGS. 1 and 2, the outermost loop of film 3 is not adhered to any other film. This loop of film 3 would normally be unwound and cut off. Then when the ends of films 2 and 3 are subsequently unwound for use, those films are tightly laminated together with film 3 protecting the imprint or design laid down at the printing stations 6, 7, and 8 on printing press 4. When this process is used for preparing a cover film laminate which carries no imprint, only printing station 9 on printing press 4 is used for laying down a uniform layer of the pressure-sensitive saran adhesive used in forming the desired film laminate. The laminated films are used in the formation of packages by vacuum forming techniques and other packaging techniques are easily heat sealed. When these films are used for formation of packages, the polyethylene surfaces of the adjacent films are brought together in the formation of the package and the peripheral areas of contact are heat sealed using any conventional heat sealing apparatus.

Figure 3:
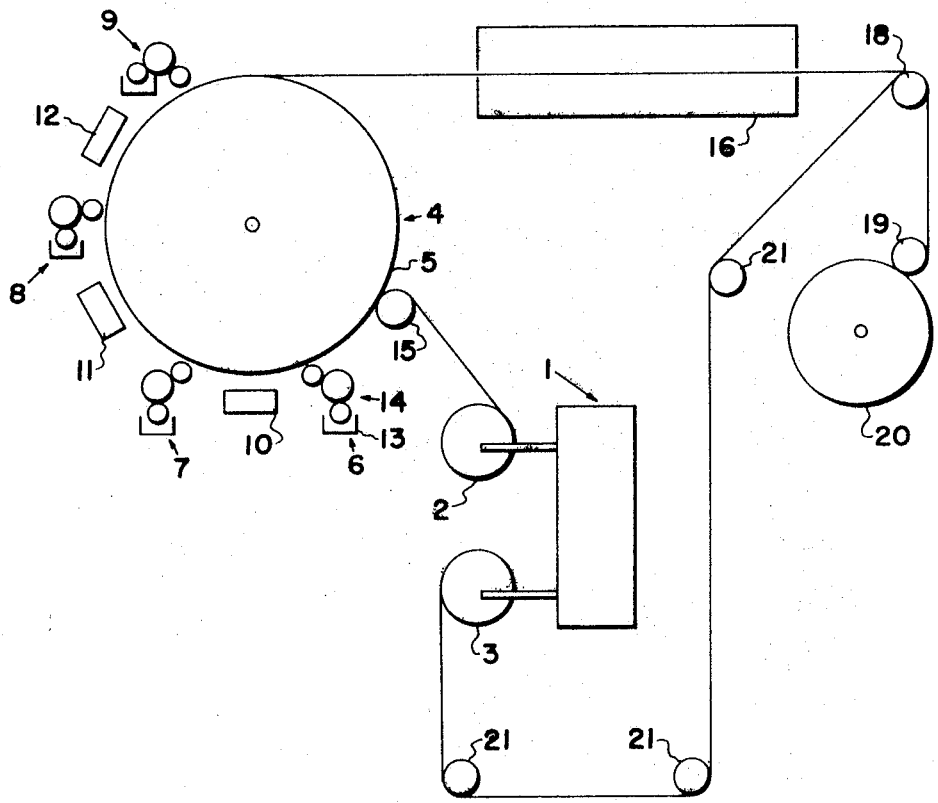
FIG. 3 is a schematic view of an alternate preferred embodiment of the invention in which one film ply has a laminating adhesive applied on a printing press and another film ply combined with the printed ply on the storage reel.
Figure 4:
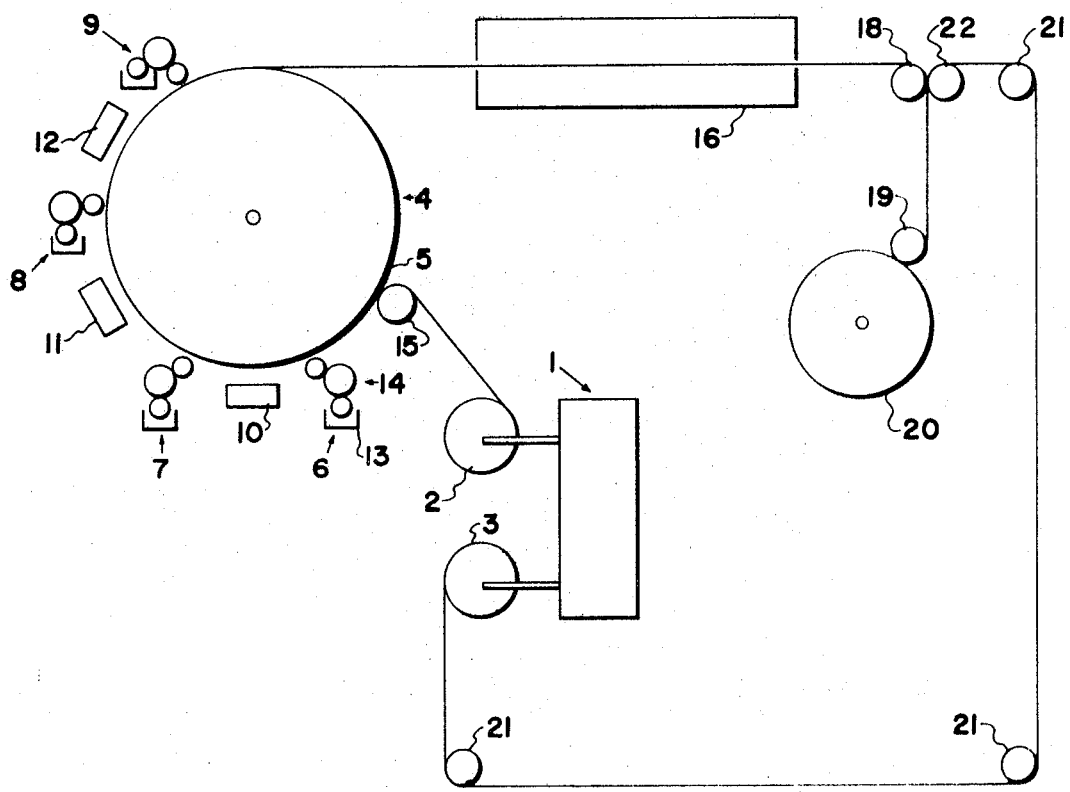
FIG. 4 is a schematic view of still another preferred embodiment of this invention in which one film ply has a laminating saran adhesive applied on a printing press and another film ply combined with the saran adhesive coated film prior to winding on the storage reel.

In carrying out the process described in FIGS. 1 and 2, it is necessary that the film plies passing through dryer 16 be moved at a sufficient speed or the dryer operated at sufficiently low temperature that the heat sealable film 3 (e.g., polyethylene) will not shrink. If the dryer temperature is too high or if the film has a residence time in the dryer sufficient that film 3 is heated above the shrinkage temperature, the film laminate will wrinkle badly as a result of shrinkage or distortion of the heat sealable film 3. In FIGS. 3 and 4 of the drawing, there is shown schematically an alternate preferred embodiment of the invention which avoids the problem of heat sensitivity of the heat sealable film in forming the film laminate.

In the apparatus and process shown in FIG. 3, the various steps of the process and the various components of the apparatus are essentially as shown and described in FIG. 1 except that the film plies are combined after the printed and saran-containing adhesive coated film leaves the dryer. In the schematic drawing shown in FIG. 3, the various components of the apparatus are given the same reference numerals as in FIG. 1. In the embodiment of the invention shown in FIG. 3, however, plastic film 3 is fed through the printing press alone and is printed and finally overcoated with saran-containing adhesive at printing station 9. The printed and adhesive overcoated film is then passed through the dryer 16 as in the embodiment shown in FIG. 1. The heat-sealable film 2 is fed over rolls 21 and finally combined with film 3 at roller 18. After the films pass over rollers 18, the saran-adhesive coating is still to the outside of film 3. The two films then pass around press roller 19 and are wound up on reel 20 as in the embodiment described in FIG. 1. As the films are wound up on reel 20, they are adhesively laminated with the result that the adhesive is eventually cured, either by extended storage at room temperature or a shorter storage at slightly elevated temperature, thereby producing an optically clear film laminate having printing located between the dimensionally stable film 3 and the heat sealable film 2.

Figure 5:
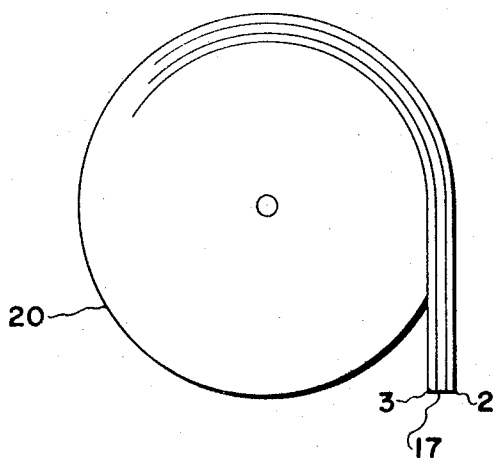
FIG. 5 is a detail end view of the storage reel of the process and apparatus shown in FIG. 4 and illustrates the relationship of the laminated plies.

In FIGS. 4 and 5 of the drawings, there is shown still another alternate embodiment of this invention. In this form of the invention, the dimensionally stable film 2 is fed through the printing press as in the form of the invention shown in FIG. 3. The film is printed, if desired, at the various stations and is finally overcoated with a pressure-sensitive saran-containing adhesive at printing station 9 as described for FIGS. 1 and 3. The film then passes through dryer 16 and over roll 18. The sealable film 3 is fed over rolls 21 and press roll 22 where the film 3 contacts saran-adhesive coating on film 2 and the lamination is first effected. The adhesively laminated films then pass around press roll 19 and are wound on reel 20. The pressure of press roll 22 and 19 and the tension of the films when wound on reel 20 are effective to cause sufficient laminating pressure so that when saran-containing adhesive coating 17 is cured, a good laminated film is obtained. In FIG. 5, the laminated films are shown in more detail with the adhesive layer 17 positioned between films 2 and 3 as they are wound on reel 20.

The process of this invention can be carried out with a laminator as well as a printing press. However, for reasons of economy, a one-step printing/laminating operation is preferred. As indicated, polyethylene film can also be laminated to itself in operations such as that above to produce novel film laminates suitable for packaging purposes. The polyethylene which is used is preferably film which has been subjected during its production to a surface treatment of oxidation or irradiation on only one surface so that the film surface will be somewhat adherent to inks and adhesives, particularly polyisocyanate adhesives. The top surface of the top film is an oxidized or irradiated surface while the lower surface of the lower film is similarly treated.

The saran-containing adhesive includes a saran resin to provide barrier properties to the cured film laminate and an adhesive component to provide adhesive properties. An example of a saran resin which is useful in the adhesive of this laminating process is a Dow Saran F–220 (80/20 vinylidene chloride-acrylonitrile copolymer). Although the impermeability of a saran resin depends somewhat on the particular comonomer in the resin, it depends primarily on the percentage of the comonomer and may be considered approximately independent of the particular comonomer. However, vinylidene chloride-acrylonitrile copolymers seem to give a somewhat higher impermeability than saran copolymers and are generally preferred.

In general, any saran polymer or copolymer having a vinylidene chloride content of at least 50 percent may be employed. However, a ratio of at least 70/20 vinylidene chloride-comonomer is preferred for satisfactory barrier properties in their adhesive coatings. For those applications where flexibility is of prime concern, at least 80/20 vinylidene chloride-comonomer is generally preferred for more satisfactory oxygen and moisture vapor barrier properties. The upper limit of the ratio of vinylidene chloride to comonomer in the saran is determined by flexibility and stability requirements for the particular application. If desired, an essentially 100 percent polyvinylidene chloride saran polymer may be employed in the adhesive coating.

A suitable adhesive, such as a mixture of a polyester consisting essentially of polyethylene terephthalate, modified with maleic anhydride and tall oil additives, and a polymeric polyisocyanate, preferably a polyurethane isocyanate, is added to the saran copolymer or polymer. Adhesives of this general composition are provided as adhesive concentrates and also as solutions with solvents such as toluene, methyl ethyl ketone, acetone, or ethyl acetate. Adhesives of the preferred composition are polymeric polyisocyanates such as Mondur, polyisocyanate adhesive (manufactured by Mobay Chemical Company), Marlon polyester-polyisocyanate (Marlon 403 and Marlon 383) adhesive (manufactured by The Marlon Company), and Polybond polyisocyanate adhesive (manufactured by Polymer Industries, Inc.).

The nature and preparation of the film laminates of this invention are best illustrated by the following non-limiting examples. In these examples parts, percentages or ratios are by weight unless otherwise stated.

EXAMPLE 1

This example shows the use of a saran-containing adhesive to form an oxygen and moisture vapor impermeable film laminate.

An adhesive was made up as follows:

| | |
|---|---|
| Saran F-220 | 10 lb. |
| first toluene | 10 lb. |
| next methyl ethyl ketone(MEK) | 25 lb. |
| then add | |
| A) butyrolactone | 100 g. |
| B) Mondur CB/75 | 181 g. (= 136 g. solid) |
| MEK | 120 g. |

Saran F-220 is an 80/20 vinylidene chloride-acrylonitrile copolymer. It is a broad molecular weight spectrum resin with a substantial proportion of low D.P. polymers.

The adhesive is used in laminating treated (oxidized, UV treatment, corona discharge, etc.) polyethylene to Mylar, polypropylene, and polyethylene films in accordance with the above-described coating and laminating procedures. The adhesive is dried on film 2 in drier 16 and reaches a final cure in roll 20. The saran-containing adhesive, when applied to film 2 in the printing press, produces a transparent (optically clear), slightly tacky, pressure-sensitive coating over the entire film. The saran-containing adhesive layer is of sufficient impermeability that the resulting (cured) film laminate is oxygen and moisture vapor impermeable.

EXAMPLE 2

This example shows the use of a different saran resin and solvent in the saran adhesive, together with a polyester, used to form an oxygen and moisture vapor impermeable film laminate.

For uses in this example an adhesive was made up as follows:

| | | |
|---|---|---|
| Saran F-120 | 4.5 | lb. |
| first toluene | 10 | lb. |
| next methyl ethyl ketone | 15 | lb. |
| Add | | |
| A) Santicizer-141 plasticizer | 102 | grams |
| B) Marlon 403 (polyester) | 3 | lb. |
| Marlon 383 (polyisocyanate) | 93 | grams |
| methyl ethyl ketone | (as needed) | |

Santicizer-141 is a trademark of Monsanto Chemical Company, Organic Chemicals Division, St. Louis, Mo. for octyl diphenyl phosphate.

Saran F-120 is an 80/20 vinylidene chloride-acrylonitrile copolymer in which the polymer distribution is quite close, with a larger high-molecular-weight fraction and a lower proportion of the low D. P. polymer.

Upon application of this adhesive in each of the three arrangements described above, satisfactory barrier properties were obtained in the laminates of Mylar, polypropylene and polyethylene to polyethylene sheets. The adhesive forms a flexible, optically clear, glistening, slightly tacky, pressure sensitive coating upon leaving drier 16 and is completely cured in roll 20. The film laminate is oxygen and moisture vapor impermeable. It is believed that the glistening effect is due to the polyester additive.

EXAMPLE 3

This example shows the use of a hand-lamination technique (instead of the arrangements described herein) to laminate oxidized polyethylene to cellophane.

A saran adhesive consisting of about 136 grams (solids basis) of Mondur CB polymeric polyisocyanate and 10 pounds of Saran F-220 was prepared and used to hand-laminate oxidized polyethylene to cellophane without heat cure and using 500 p.s.i. to squeeze out excess adhesive. The oxygen and moisture vapor impermeability and optical clarity of the resulting film laminate was noted. If desired, Marlon 383 and Marlon 403 (polyester) (in a solvent) can be substituted for the Mondur. The amount of solvent is not critical.

EXAMPLE 4

This example shows the use of an epoxy or polyester additive to a saran-containing adhesive.

Using 22 percent Saran F-220 mixed with 20/80 toluene-MEK the following master batch was made up in the solids ratio:

100 parts Saran F-220

3.3 parts Mondur CB polyisocyanate (as solids)

In three successive experiments, one part of the master batch; another part admixed with 2.1 parts Genepoxy 180 (a trademark of General Mills, Chemical Division, Kankakee, Ill. for a long chain epoxy resin); and another part admixed with 14.0 parts of Marlon 403, were used as the adhesive. One mil Dow 217 polyethylene sheets were hand-laminated, without heat cure, at a pressure of 500 p.s.i. to squeeze out excess adhesive lacquer. The oxygen impermeability, optical clarity and flexibility of the resulting film laminates were in the desired range. Specifically, it was noted that the film laminate produced with the saran adhesive incorporating the epoxy additive was more oxygen impermeable than the film laminate produced with the master batch saran adhesive. Furthermore, the film laminate with the saran adhesive incorporating the polyester additive was highly flexible and glistening and had satisfactory oxygen impermeability.

In each of the laminates prepared in the various examples the cured adhesive layer forms an oxygen impermeable barrier. By oxygen impermeable is meant that the barrier must have an oxygen permeability less than $20 \times 10^{-10}$ cc.—mm./sec./cm.$^2$/cm. For ground meat (particularly ground beef) packaging an oxygen permeability ranging from $0.01 \times 10^{-10}$ to $1.0 \times 10^{-10}$ and preferably from $0.01 \times 10^{-10}$ to $0.1 \times 10^{-10}$ cc.-mm./sec./cm.$^2$/cm. Hg at 30° C. is required in the film laminate. Oxygen permeabilities are determined by the techniques referred to in the Journal of Polymer Science 16, 89–91 (1955). The moisture-vapor permeability of the laminated film should be from about $0.40 \times 10^{-6}$ to $0.60 \times 10^{-6}$ gm.—cm./sq. cm./24 hr. for ground meat packaging. These values were obtained using Payne permeability cups containing anhydrous calcium chloride. The cups were kept in the isothermal cabinet for nine days at 33° C. and 60 percent relative humidity. The nitrogen and carbon dioxide permeability values of saran as listed in the Journal of Polymer Science 16, 89–91 (1955) are $0.0094 \times 10^{-10}$ and $0.29 \times 10^{-10}$ cc./mm./sec. cm.²/cm. Hg at 30° C. Satisfactory oxygen and moisture vapor permeability values were obtained in the examples.

In the foregoing examples the invention was described with reference to a two-ply laminate. It should be understood that the invention may be used in laminates of three or more plies using a saran-containing adhesive to yield the desired oxygen and water-vapor impermeability.

While this invention has been described fully and completely with reference to certain specific embodiments as required by the patent laws, it must be understood that within the scope of the appended claims this invention may be practiced otherwise than as specifically described herein.

We claim:

1. As an article of manufacture, a plastic film laminate comprising a first plastic film ply laminated to a second plastic film ply by a pressure-sensitive curable saran-containing adhesive, comprising a chemically reactive curable component operable upon curing to cross-link within the adhesive layer and to each film ply, said curable component comprising a polymeric isocyanate and sufficient saran resin to render the laminate substantially impermeable to both water vapor and oxygen.

2. An article in accordance with claim 1 in which said first plastic film ply is nylon, polyester, polypropylene, polyethylene or cellophane, and said second plastic film ply is surface-treated polyethylene.

3. An article as defined in claim 2 in which the pressure sensitive saran-containing adhesive includes a polymeric polyisocyanate.

4. An article as defined in claim 2 in which said saran-containing adhesive includes a polyester.

5. An article as defined in claim 2 in which said saran-containing adhesive includes an epoxy resin.

* * * * *